(12) United States Patent
Hong et al.

(10) Patent No.: US 7,821,577 B2
(45) Date of Patent: Oct. 26, 2010

(54) DISPLAY DEVICE AND METHOD OF DRIVING THE SAME

(75) Inventors: Su Dong Hong, Gumi-si (KR); Sang Chul Bae, Daegu (KR)

(73) Assignee: LG Electronics Inc., Seoul (KR)

( * ) Notice: Subject to any disclaimer, the term of this patent is extended or adjusted under 35 U.S.C. 154(b) by 402 days.

(21) Appl. No.: 10/582,522

(22) PCT Filed: Dec. 10, 2004

(86) PCT No.: PCT/KR2004/003256

§ 371 (c)(1),
(2), (4) Date: Mar. 15, 2007

(87) PCT Pub. No.: WO2005/057533

PCT Pub. Date: Jun. 23, 2005

(65) Prior Publication Data

US 2007/0258010 A1 Nov. 8, 2007

(30) Foreign Application Priority Data

Dec. 12, 2003 (KR) ........................ 10-2003-0090498

(51) Int. Cl.
*H04N 9/74* (2006.01)

(52) U.S. Cl. ........................................ 348/564; 348/576

(58) Field of Classification Search ......... 348/552–570, 348/671–698; 715/788–838
See application file for complete search history.

(56) References Cited

U.S. PATENT DOCUMENTS

| 4,754,332 A | * | 6/1988 | Bergquist ................. 348/576 |
| 5,557,338 A | | 9/1996 | Maze et al. |
| 6,493,038 B1 | | 12/2002 | Singh et al. |
| 7,428,018 B2 | * | 9/2008 | Kim et al. ................. 348/564 |
| 2003/0179242 A1 | | 9/2003 | Alexander et al. |
| 2003/0227570 A1 | | 12/2003 | Kim et al. |

FOREIGN PATENT DOCUMENTS

| CN | 1248375 A | 3/2000 |
| CN | 1404685 A | 3/2003 |
| CN | 100542230 | 9/2009 |
| EP | 0957631 | 11/1999 |
| EP | 1 211 894 A2 | 6/2002 |
| JP | 2001-268475 | 9/2001 |
| RU | 2 107 405 C1 | 3/1998 |

OTHER PUBLICATIONS

Chinese Office Action dated Sep. 7, 2007.
(Continued)

*Primary Examiner*—M. Lee
(74) *Attorney, Agent, or Firm*—KED & Associates, LLP (57) ABSTRACT

A display device and a method of driving the same are disclosed, wherein a single original image is converted into a picture-enhanced image and a non-enhanced image, which are then displayed. The display device includes a controller (140) dividing a screen into a first display window and a second display window, and outputting control signals based on display options corresponding to the first display window and the second display window, and a video processing unit (160) separating an original image into a first image part and a second image part, and modifying picture qualities of each of the first image part and the second image part that are to be displayed on each of the first display window and the second display window, depending upon the control signals.

17 Claims, 7 Drawing Sheets

OTHER PUBLICATIONS

PCT International Search Report dated Jun. 20, 2005.
Russian Search Report dated Dec. 31, 2008 and English language translation.
Korean Office Action dated Oct. 26, 2005.
Russian Decision on Grant of Patent dated Oct. 13, 2009 and English-language translation.

* cited by examiner

FIG. 7 original image

170

First image part
(picture-enhanced)

Second image part

FIG. 8 original image

170

First full image
(picture-enhanced)

Second full image

DISPLAY DEVICE AND METHOD OF DRIVING THE SAME

TECHNICAL FIELD

The present invention relates to a display device, and more particularly, to a display device and a method of driving the same.

BACKGROUND ART

As digital broadcasting is being accelerated, high quality broadcast programs and, more specifically, high definition (HD) and high fidelity (Hi-Fi) broadcast programs are being provided and broadcasted through satellite, ground wave, and cable. Unlike the conventional analog television receiver, noise and ghost effect are decreased in digital television receivers. Also, signal errors that may occur during transmission can be automatically corrected, thereby enhancing the picture and sound qualities at a remarkable rate, so as to realize high quality broadcast services.

In addition, the digital television receiver may provide an HDTV 1-channel or an SDTV 3-5 channel through the conventional 1-channel (60 megahertz (MHz)). The digital television receiver may also provide image and sound, as well as diverse information, such as stock market information, traffic information, and so on. Another advantage of the digital television is that the broadcast program may be easily edited, stored, and reproduced (or played-back), not to mention that the amount of video data and audio may be flexibly adjusted. Furthermore, the digital television receiver may be connected on-line and linked with other telecommunication media. For example, the digital television may receive various contents and information necessary for everyday life through the Internet, and may also perform reciprocal communication, such as electronic commerce activities.

Recently manufacturers of television receivers have begun promoting their own picture-enhancement technologies. For example, Samsung Electronics, Co., Ltd. introduced the Digital Natural Image Engine (DNIE), LG Electronics Inc. introduced the Excellent Digital Reality (XDRPRO), and Sony Corp. introduced the WEGA engine as their own picture-enhancement technologies. The promotion television receivers fabricated with the above-mentioned picture-enhancement technologies can display two different images onto a divided (or split) screen. This is to allow viewers (or users) to compare one of the displayed images, which is a picture-enhanced image, with the other one of the displayed images, which is a non-enhanced image.

In order to display the picture-enhanced image, the promotion television receiver requires a picture-enhancement chip. And, in order to display the non-enhanced image, the promotion television receiver is required to process two different types of input sources (or video signals). Eventually, the additional chip causes an increase in the fabrication cost. Furthermore, since each of the two images has a different input source, the picture-enhancement efficiency of the television receiver is decreased, thereby causing problems in successfully promoting the digital television receiver fabricated with the picture-enhancing technology.

DISCLOSURE OF INVENTION

An object of the present invention devised to solve the problem lies on providing a display device and a method of driving the same that can convert a single input source into a picture-enhanced image and a non-enhanced image, so as to display the images.

The object of the present invention can be achieved by providing a display device including a controller dividing a screen into a first display window and a second display window, and outputting control signals based on display options corresponding to the first display window and the second display window, and a video processing unit separating an original image into a first image part and a second image part, and modifying picture qualities of each of the first image part and the second image part that are to be displayed on each of the first display window and the second display window, depending upon the control signals.

Herein, the display options may include position and size adjustments for each of the first display window and the second display window, and the display options may also include picture quality adjustments for each of the first image part and the second image part that are to be displayed on each of the first display window and the second display window.

The video processing unit may adjust the position and the size of each of the first image part and the second image part, so as to be identical to the position and the size of each of the first display window and the second display window. Herein, the video processor may include a video adjusting unit separating the original image into the first image part and the second image part, and adjusting the position and the size of the first image part and the second image part that are to be displayed, and a first video processor and a second video processor modifying the picture quality of each of the first image part and the second image part, so as to provide different picture qualities.

Another object of the present invention can be achieved by providing a display device including a controller outputting control signals including display information for each of a plurality of divided display windows, and a video processing unit converting an original image into either a plurality of full images each having a different picture quality, or a plurality of image parts each having a different picture quality, depending upon the display information, and displaying the full images or the image parts on each of the display windows. Herein, the display information may include information representing whether the full images are to be displayed on each of the display windows or whether the image parts are to be displayed on each of the display windows.

Another object of the present invention can be achieved by providing a method of driving a display device including setting up display options for a first display window and a second display window, which are divided on a screen, outputting control signals based on the display options, dividing an original image into a first image part and a second image part, and converting a picture quality of each of the first image part and the second image part, so as to provide different picture qualities, wherein the first image part and the second image part are to be displayed on each of the first display window and the second image window.

The step of setting up display options may include setting up picture qualities of each of the first image part and the second image part, which are to be displayed on each of the first display window and the second display window, setting up a position and a size of each of the first display window and the second display window, and setting up a ratio between the size of the first display window and the size of the second display window. And, the method of driving the display device may also include selecting any one of the first image part and the second image part, both of which are displayed on each of the first display window and the second display window, and displaying the selected image part on the first display window and the second display window.

A further object of the present invention can be achieved by providing a method of driving a display device including outputting display information for a plurality of display windows, which are divided on a screen, converting an original image into either a plurality of full images each having a different picture quality, or a plurality of image parts each having a different picture quality, depending upon the display information, and displaying the full images or the image parts on each of the display windows. Herein, the step of converting an original image may include transmitting the original image to a plurality of video processors for converting the original image into either the plurality of full images each having a different picture quality, or the plurality of image parts each having a different picture quality.

The method of driving the display device may include selecting one of the full images that are displayed on each of the display windows, and zooming-in the selected full image and displaying the zoomed-in full image on all of the display windows. And, the method may also include selecting one of the image parts that are displayed on each of the display windows, and displaying the image parts displayed on each of the display windows with the same picture quality as that of the selected image part.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
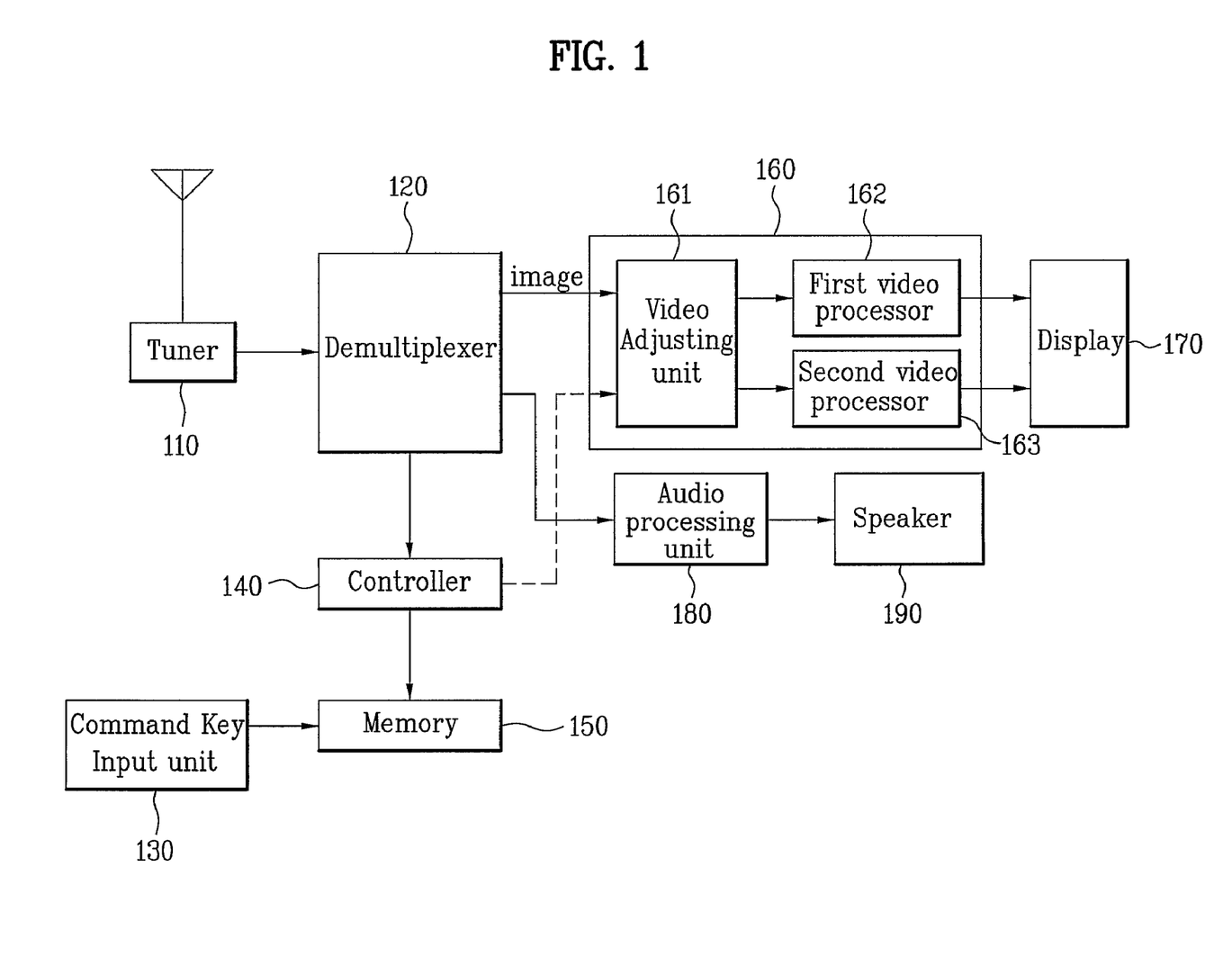
FIG. 1 illustrates a block diagram showing a structure of a display device according to the present invention.

FIG. 1 illustrates a block diagram showing a structure of a display device according to the present invention. Referring to FIG. 1, a tuner 110 selects a desired channel among a plurality of broadcast signals being received through an antenna. A demultiplexer 120 separates the signal outputted from the tuner 110 into a video signal (or image), an audio signal (or sound), and additional information. The video signal, the audio signal, and the additional information outputted from the demultiplexer 120 are each transmitted to a video processing unit 160, an audio processor 180, and a controller 140, respectively. A memory 150 receives the additional information from the controller 140 and stores the received additional information. Moreover, the memory 150 also stores a reference image that is to be displayed on a screen of a display 170, when a picture-enhancing demo mode is selected. For example, the memory 150 stores various still images.

The video processing unit 160 either receives an original image (or video source) from the demultiplexer 120 or the memory 150, or receives the original image from an external device, such as a digital video disc (DVD), a personal video recorder (PVR), and so on. When the picture-enhancing demo mode is selected, the video processing unit 160 processes the original image by two different methods. In the first method, the video processing unit 160 divides the original image into a first image part and a second image part. Then, by using a predetermined algorithm, the video processing unit 160 enhances the picture quality of one of the first and second image parts. For example, the picture quality of the first image part is enhanced, and the picture quality of the second image part remains the same (i.e., non-enhanced). Subsequently, the picture-enhanced first image part and the non-enhanced second image part are simultaneously outputted. In the second method, the picture quality of the entire original image (or full image) is enhanced. Thereafter, the picture-enhanced full image and the non-enhanced full image are simultaneously outputted.

The video processing unit 160 includes a video adjusting unit 161, a first image processor 162, and a second image processor 163. The video adjusting unit 161 separates the original image into the first image part and the second image part and sets up the position and size of the first and second image parts. The first video processor 162 receives the first image part and converts the received first image part to a displayable video signal. At this point, the first video processor 162 enhances the picture quality of the received first image part. For example, the first video processor 162 determines and controls the optimum resolution, definition, luminance, and so on, corresponding to the first image part. On the other hand, the second video processor 163 receives the second image part and converts the received second image part into a displayable video signal.

Figure 2:
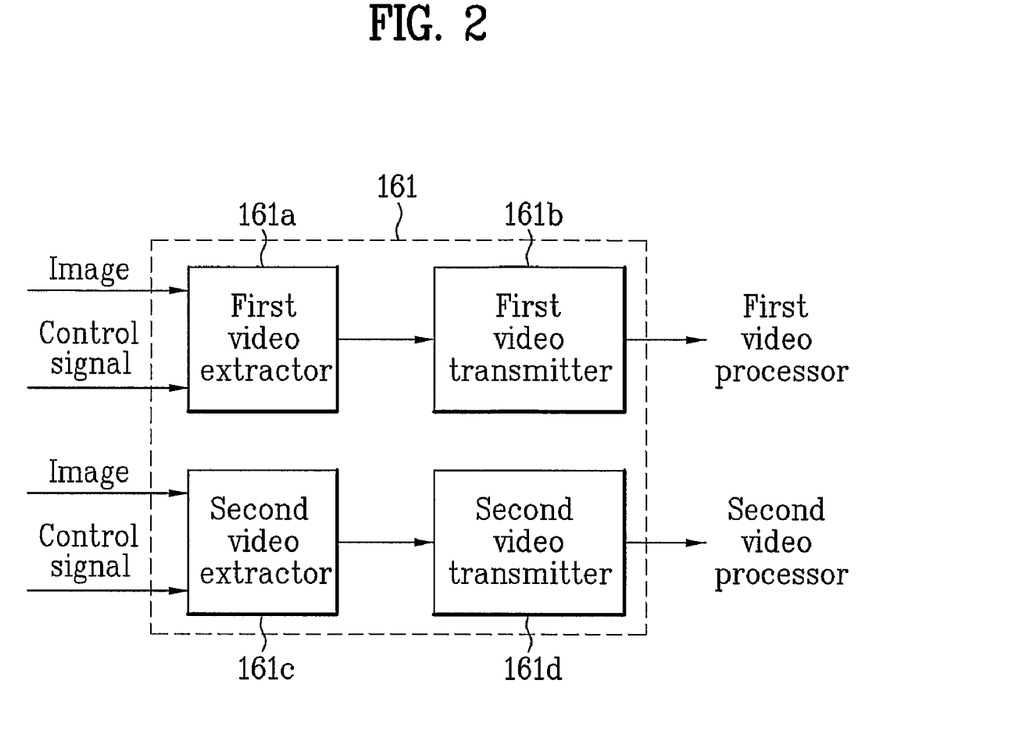
FIG. 2 illustrates an example of a video adjusting unit of FIG. 1.

FIG. 2 illustrates an example of the video adjusting unit of FIG. 1. A first video extractor 161a receives the original image from the demultiplexer 120 and receives a control signal from the controller 140. Also, the first video extractor 161a extracts the first image part from the original image based on the control signal received from the controller 140. A first video transmitter 161b controls the position and size of the first image part displayed on the screen. For example, the first video transmitter 161b sets up a pixel address of the first image part and, then, either enlarges or reduces the size of the first image part so that the first image part becomes identical to the given screen size.

A second video extractor 161c receives the original image from the demultiplexer 120 and receives a control signal from the controller 140. In addition, the second video extractor 161c extracts the second image part from the original image based on the control signal received from the controller 140. A second video transmitter 161d controls the position and size of the second image part displayed on the screen. For example, the second video transmitter 161d sets up a pixel address of the second image part and, then, either enlarges or reduces the size of the second image part so that the second image part becomes identical to the given screen size.

Figure 3:
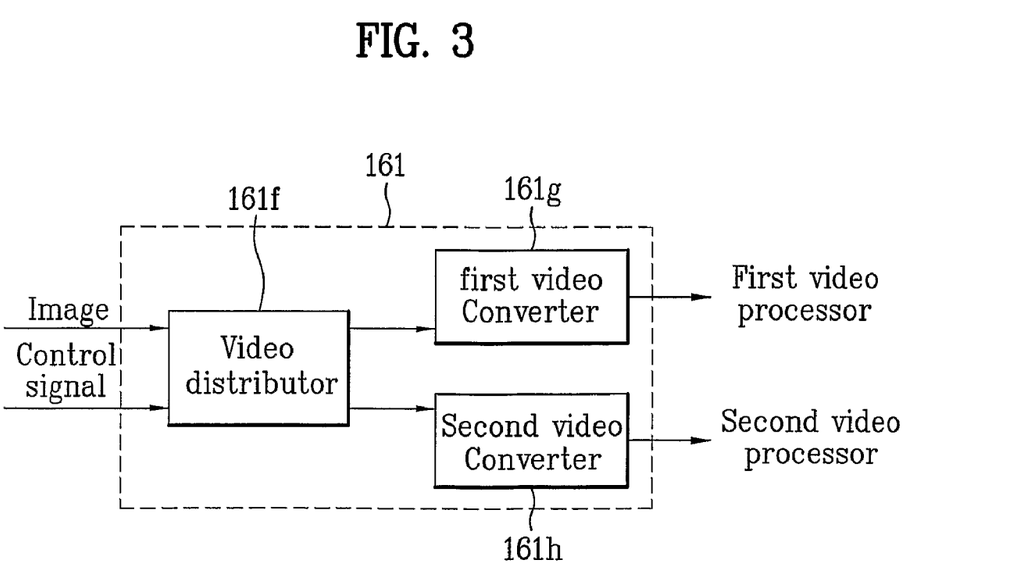
FIG. 3 illustrates another example of a video adjusting unit of FIG. 1.

FIG. 3 illustrates another example of the video adjusting unit of FIG. 1. A video distributor 161f receives the original image from the demultiplexer 120 and receives a control signal from the controller 140. Then, the video distributor 161f separates the original image into the first image part and the second image part based on the control signal received from the controller 140. The video distributor 161*f* transmits the first image part that is to be picture-enhanced to a first video converter 161*g*. Alternatively, the video distributor 161*f* transmits the second image part that does not need to be picture-enhanced to a second video converter 161*h*. Thereafter, each of the first and second video converters 161*g* and 161*h* controls the position and size of the first and second image parts, respectively.

Figure 4:
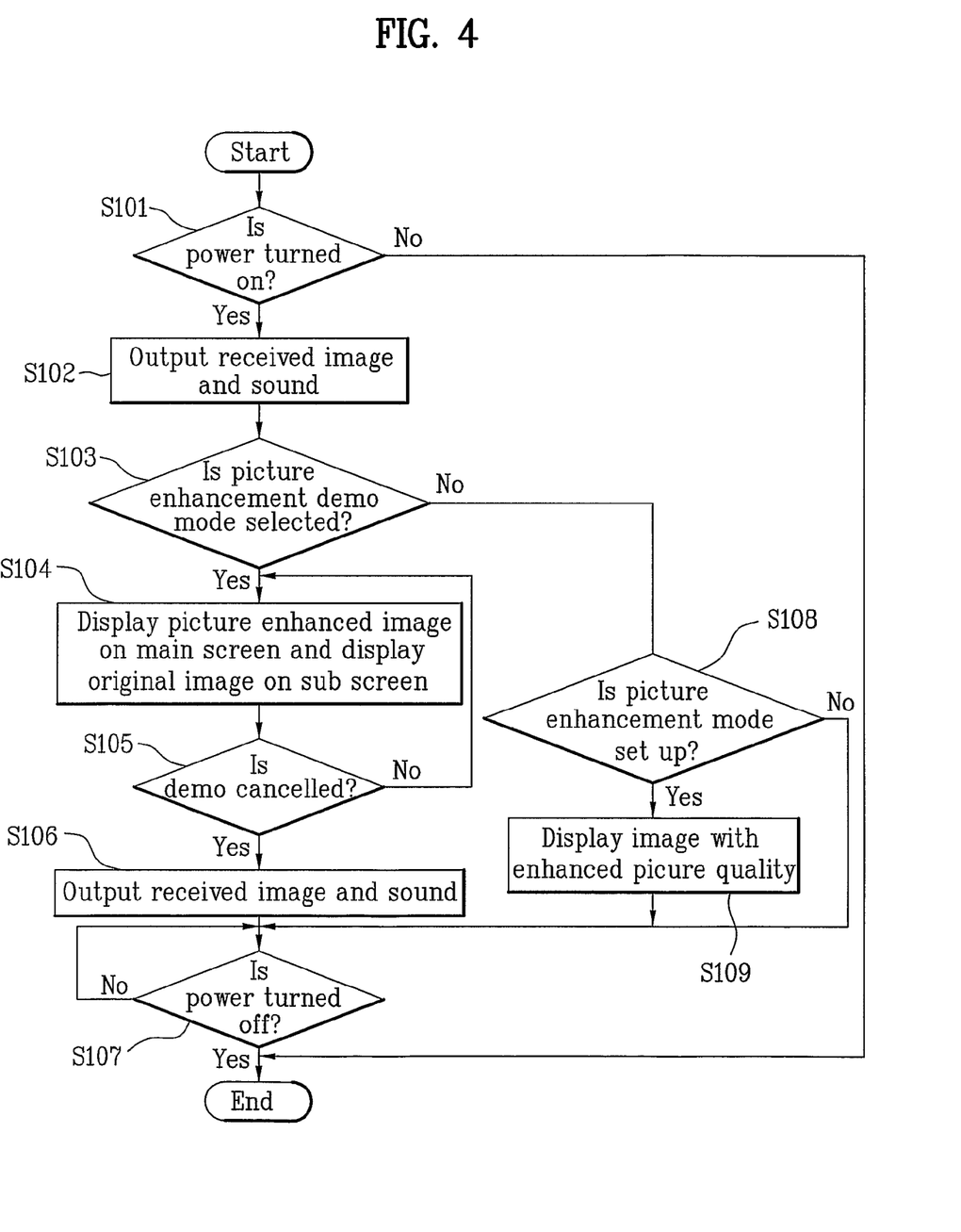
FIG. 4 illustrates flow chart of a method of driving the display device according to the present invention.

A method of driving the display device according to the present invention will now be described in detail. Referring to FIG. 4, when the display device is turned on (S101), the image is displayed on a screen, and the sound is outputted through a speaker 190 (S102). The controller 140 determines whether a demo mode is selected (S103), wherein the demo mode demonstrates a difference in picture quality between a picture-enhanced image and a non-enhanced image. If the demo mode is not selected, the controller 140 determines whether a picture-enhancement mode for displaying a picture-enhanced image is selected (S108). Alternatively, if the demo mode is selected, the video adjusting unit 161 does not separate the original image and transmits the full original image to the first video processor 162. Herein, the first video processor 162 processes the transmitted original image so as to enhance the picture quality. Then, the first video processor 162 displays the picture-enhanced original image to the entire screen (S109).

Figure 5:
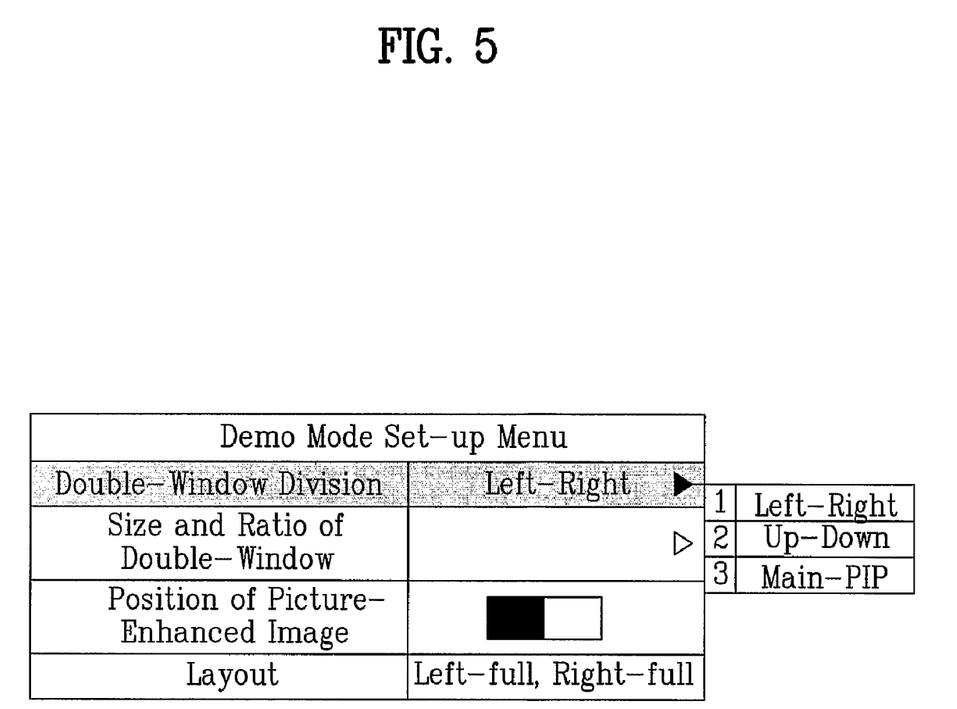
FIG. 5 illustrates a menu for setting-up a demo mode.

When a user selects the demo mode, the controller 140 displays on the screen a menu for selecting options related to the demo mode. The user uses the menu for setting up the demo mode to set up the number of display windows, the shape of the display windows, and so on. FIG. 5 illustrates an example of a menu for setting up the demo mode. Referring to FIG. 5, the menu includes options related to the double-window display. The user uses the double-window option to divide (or split) an active picture to "Left-Right", "Up-Down", and "Main Picture-Picture in Picture (PIP)" pictures (or display parts). The menu also includes options for designating the position of the picture-enhanced image. The user may select whether to display the picture-enhanced image on the left part of the active picture, whether to display the picture-enhanced image on the upper part of the active picture, or whether to display the picture-enhanced image as a main picture or as a picture-in-picture (PIP).

Also, the menu includes options for adjusting the size of the double-window, the ratio between the windows (or size ratio), and so on. Herein, the position and size of the double-window may be represented by a pixel address. Furthermore, the menu includes layout options, which are options for deciding (or selecting) whether to display a picture-enhanced full image and a non-enhanced full image on each of the windows, whether to display a picture-enhanced half image and a non-enhanced half image on each of the windows, or whether to display a picture-enhanced partial image and a non-enhanced partial image on each of the windows. Additionally, a full image may be displayed on one of the windows, while a half or partial image is displayed on the other one of the windows.

When the user selects the options related to the demo mode, the controller 140 outputs the control signals based on the selected options to the video processing unit 160. Herein, the control signals include information on screen division of the double-window, information on the position and size of the double-window, information on the position of the picture-enhanced image, information on the layout, and so on. Examples of representing the double-window in accordance with the options related to the demo mode will now be described in detail.

Example 1

Figure 6:
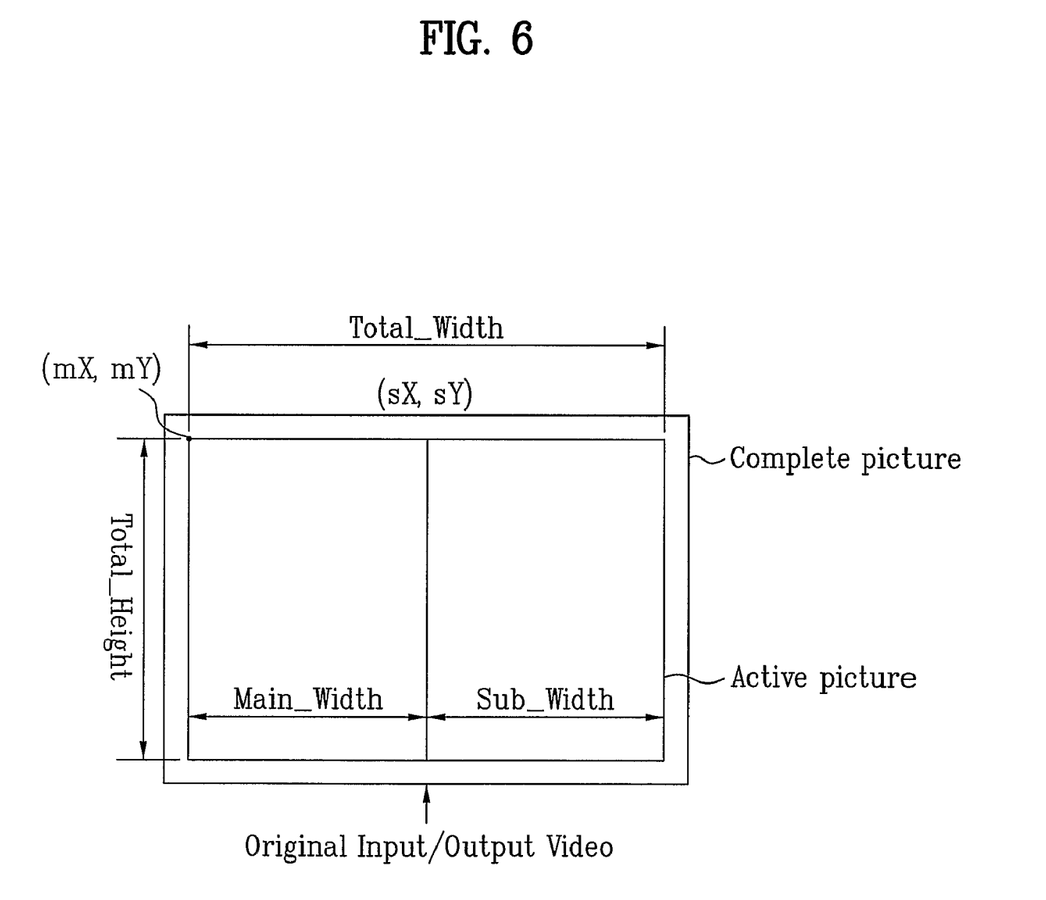
FIG. 6 illustrates an example of a double-window display.

In the first example, the active picture is divided into left and right windows, wherein a picture-enhanced half image and a non-enhanced half image are displayed on each of the windows, respectively. The video adjusting unit 161 separates (or divides) the original image into the first image part and the second image part, and adjusts the size and position of each of the first and second image parts depending upon the control signal. FIG. 6 illustrates an example of the double-window display. Referring to FIG. 6, the video adjusting unit 161 adjusts the position and size of the first and second image parts, so that the first and second image parts fit the predetermined double-window. More specifically, a plurality of starting points of each of the first and second image parts is set to correspond to a plurality of starting points of the double-window (mX, mY) and (sX, sY) on the active picture. Finally, the size of each of the first and second image parts is adjusted so as to be identical with a total-height and a main-width and sub-width of the double-window.

Figure 7:
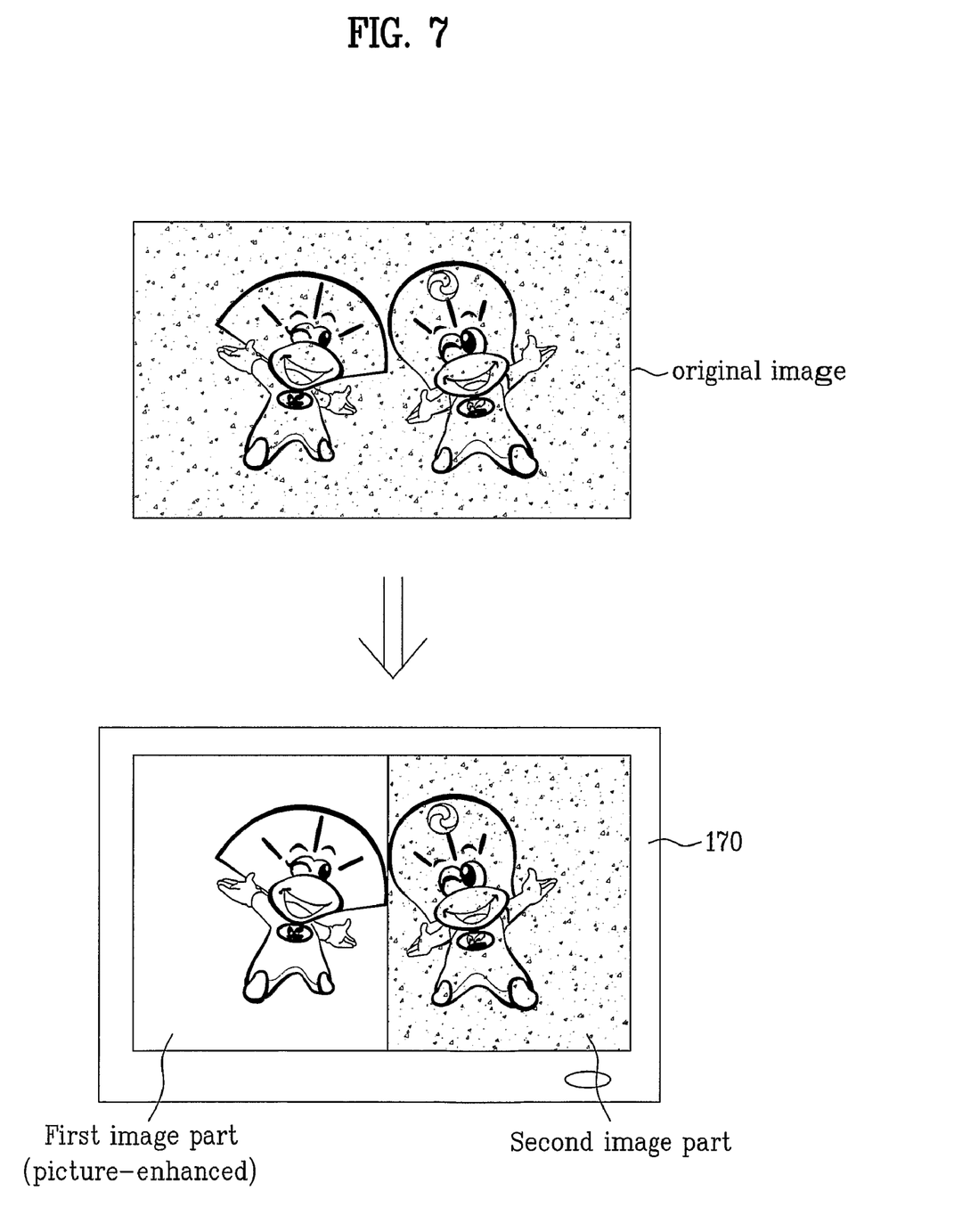
FIG. 7 illustrates an image part with enhanced picture quality and an image part with non-enhanced picture quality.

The video adjusting unit 161 transmits the image part that requires picture enhancement to the first image processor 162, which has picture-enhancing functions. The video adjusting unit 161 also transmits the image part that does not require picture enhancement to the second image processor 163. For example, when the first image part is to be picture-enhanced, the first image part is transmitted to the first image processor 162. Subsequently, the first image processor 162 converts the first image part into a displayable video signal and simultaneously enhances the picture quality of first image part. In addition, the first image processor 162 may enhance the first image part to an optimum picture quality while taking into account the environment surrounding the display device, such as the illumination intensity (i.e., intensity of light or brightness) around the display device. The second image processor 163 converts the second image part into a displayable video signal. Referring to FIG. 7, the video signal outputted from the first image processor 162 is displayed on the left window, and the video signal outputted from the second image processor 163 is displayed on the right window (S104).

As the user selects any one of the left and right windows, the image corresponding to the selected window may be displayed on the entire active picture. More specifically, any one of the picture-enhanced image and the non-enhanced image is selectively displayed on the entire active picture. For example, when the user uses the command key input unit 130 or a remote controller to select the left window, the video adjusting unit 161 transmits the original image to the first image processor 162 only, and the first image processor 162 displays the picture-enhanced full image to the entire active picture. At this point, the video adjusting unit 161 does not transmit the original image to the second image processor 163.

Example 2

In the second example, the active picture is divided into left and right windows, wherein a picture-enhanced full image and a non-enhanced full image are displayed on each of the windows, respectively. Herein, the video adjusting unit 161 does not separate (or divide) the original image into two parts. Each of the first and second video extractors 161*a* and 161*c* respectively outputs the original image to each of the first and second video transmitters 161*b* and 161*d*. The first video transmitter 161*b* adjusts the position and size of the original image, so as to fit the position and size of the left window.

And, the second video transmitter 161*d* adjusts the position and size of the original image, so as to fit the position and size of the right window. The image outputted from the first image transmitter 161*b* is referred to as a first full image, and the image outputted from the second image transmitter 161*d* is referred to as a second full image.

Figure 8:
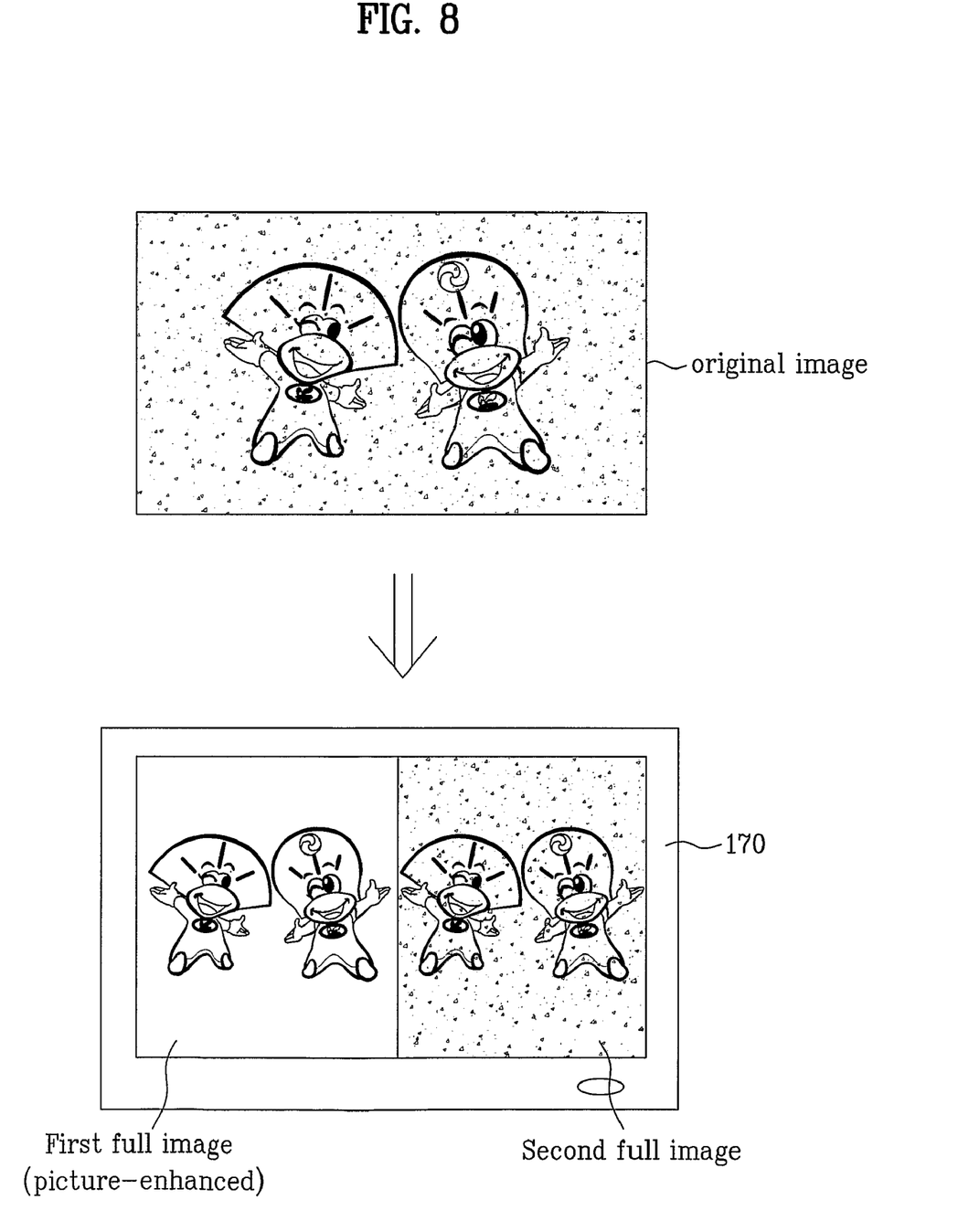
FIG. 8 illustrates a full image with enhanced picture quality and a full image with non-enhanced image quality.

The video adjusting unit 161 transmits the image that requires picture enhancement to the first image processor 162, which has picture-enhancing functions. The video adjusting unit 161 also transmits the image that does not require picture enhancement to the second image processor 163. For example, when the first full image is to be picture-enhanced, the first full image is transmitted to the first image processor 162. Subsequently, the first image processor 162 converts the first full image into a displayable video signal and simultaneously enhances the picture quality of first full image. In addition, the first image processor 162 may enhance the first full image to an optimum picture quality while taking into account the environment surrounding the display device, such as the illumination intensity (i.e., intensity of light or brightness) around the display device. The second image processor 163 converts the second full image into a displayable video signal. Referring to FIG. 8, the picture-enhanced first full image is displayed on the left window, and the non-enhanced second full image is displayed on the right window (S104).

As the user selects any one of the left and right windows, the full image corresponding to the selected window may be displayed on the entire active picture. More specifically, any one of the picture-enhanced image and the non-enhanced image is selectively displayed on the entire active picture. For example, when the user uses the command key input unit 130 or a remote controller to select the left window, the video adjusting unit 161 transmits the original image to the first image processor 162 only, and the first image processor 162 displays the picture-enhanced first full image to the entire active picture. At this point, the video adjusting unit 161 does not transmit the original image to the second image processor 163.

Finally, when the user cancels the demo mode (S105), the double-window disappears from the screen, and one of the original image and the picture-enhanced image is displayed on the active picture (S106). The present invention proposes a video processor having a picture-enhancing function and a video processor that does not have a picture-enhancing function. However, the structure of the present invention is not limited to only two video processors, and the picture division is not limited to only a double-window structure. For example, in order to display images of a wide range of picture quality, a plurality of video processors may be included in the present invention, such as a video processor for a movie mode, a video processor for a documentary mode, a video processor for a game mode, and so on. And, the plurality of the images having different picture qualities is displayed to each of the divided picture windows (or picture segments).

Furthermore, a single original image is converted into a picture-enhanced image and a non-enhanced image, which are then simultaneously displayed, thereby allowing the user to determine the picture enhancement ability of the display device. Therefore, the present invention can be applied to a demo-type display device for promoting the picture-enhancing technology.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method of converting a single image into a picture-enhanced image and a non-enhanced image, which are then simultaneously displayed, thereby allowing a user to determine the picture enhancement ability of the display device, which can be applied to a demo-type display device for promoting the picture-enhancing technology.

What is claimed is:

1. A display device, comprising:
    a controller dividing a screen into a first display window and a second display window, and outputting control signals based on display options corresponding to the first display window and the second display window; and
    a video processing unit separating an original image into a first image part and a second image part, and adjusting a position and a size of each of the first image part and the second image part, so as to be identical to a position and a size of the first display window and the second display window and modifying picture qualities of each of the first image part and the second image part that are to be displayed on the first display window and the second display window respectively, depending upon the control signals.

2. The display device of claim 1, wherein the display options include position and size adjustments for each of the first display window and the second display window.

3. The display device of claim 1, wherein the display options include picture quality adjustments for each of the first image part and the second image part that are to be displayed on each of the first display window and the second display window.

4. The display device of claim 1, wherein the video processing unit comprises:
    a video adjusting unit separating the original image into the first image part and the second image part, and adjusting the position and the size of the first image part and the second image part that are to be displayed; and
    a first video processor and a second video processor modifying the picture quality of each of the first image part and the second image part, so as to provide different picture qualities.

5. A display device, comprising:
    a controller outputting control signals including display information for each of a plurality of divided display windows; and
    a video processing unit adjusting either a position and a size of each of a plurality of full images that are to be displayed, or a position and a size of each of a plurality of image parts that are to be displayed, depending on the display information and converting an original image into either the plurality of full images each having a different picture quality, or the plurality of image parts each having a different picture quality, depending upon the display information, and displaying the full images or the image parts on each of the display windows.

6. The display device of claim 5, wherein the display information includes information representing whether the full images are to be displayed on each of the display windows or whether the image parts are to be displayed on each of the display windows.

7. The display device of claim 5, wherein the display information includes alignment and size information of each of the display windows.

8. The display device of claim 5, wherein the video processing unit comprises:
a video adjusting unit outputting the original image or separating the original image into a plurality of separated images, depending upon the display information; and
a plurality of video processors converting the original image into the full image each having a different picture quality, or converting the separated images into a plurality of image parts each having a different picture quality.

9. A method of driving a display device, comprising:
setting up display options for a first display window and a second display window, which are divided on a screen;
outputting control signals based on the display options;
dividing an original image into a first image part and a second image part;
adjusting a position and a size of each of the first image part and the second image part, so as to be identical to a position and a size of each of the first display window and the second display window; and
modifying a picture quality of each of the first image part and the second image part, so as to provide different picture qualities, wherein the first image part and the second image part are to be displayed on the first display window and the second image window, respectively.

10. The method of claim 9, wherein the setting up display options comprises setting up picture qualities of each of the first image part and the second image part that are to be displayed on each of the first display window and the second display window.

11. The method of claim 9, wherein the setting up display options comprises setting up a position and a size of each of the first display window and the second display window.

12. The method of claim 9, wherein the setting up display options comprises setting up a ratio between the size of the first display window and the size of the second display window.

13. The method of claim 9, further comprising:
selecting any one of the first image part and the second image part, both of which are displayed on each of the first display window and the second display window; and
displaying the selected image part on the first display window and the second display window.

14. A method of driving a display device, comprising:
outputting display information for a plurality of display windows, which are divided on a screen;
adjusting either a position and a size of each of a plurality of frill images that are to be displayed or a position and a size of each of a plurality of image parts that are to be displayed, depending upon the display information; and
converting an original image into either the plurality of full images each having a different picture quality, or the plurality of image parts each having a different picture quality, depending upon the display information; and
displaying the full images or the image parts on each of the display windows.

15. The method of claim 14, wherein the converting the original image comprises transmitting the original image to a plurality of video processors for converting the original image into either the plurality of full images each having a different picture quality, or the plurality of image parts each having a different picture quality.

16. The method of claim 14, further comprising:
selecting one of the full images that are displayed on each of the display windows; and
zooming-in the selected full image and displaying the zoomed-in full image on all of the display windows.

17. The method of claim 14, further comprising:
selecting one of the image parts that are displayed on each of the display windows; and
displaying the image parts displayed on each of the display windows with a same picture quality as that of the selected image part.

* * * * *